June 19, 1928.

J. H. HAND

CHANGE SPEED GEARING

Filed Feb. 10, 1927

INVENTOR.
JESSE H. HAND
BY
Parker & Burton.
ATTORNEY.

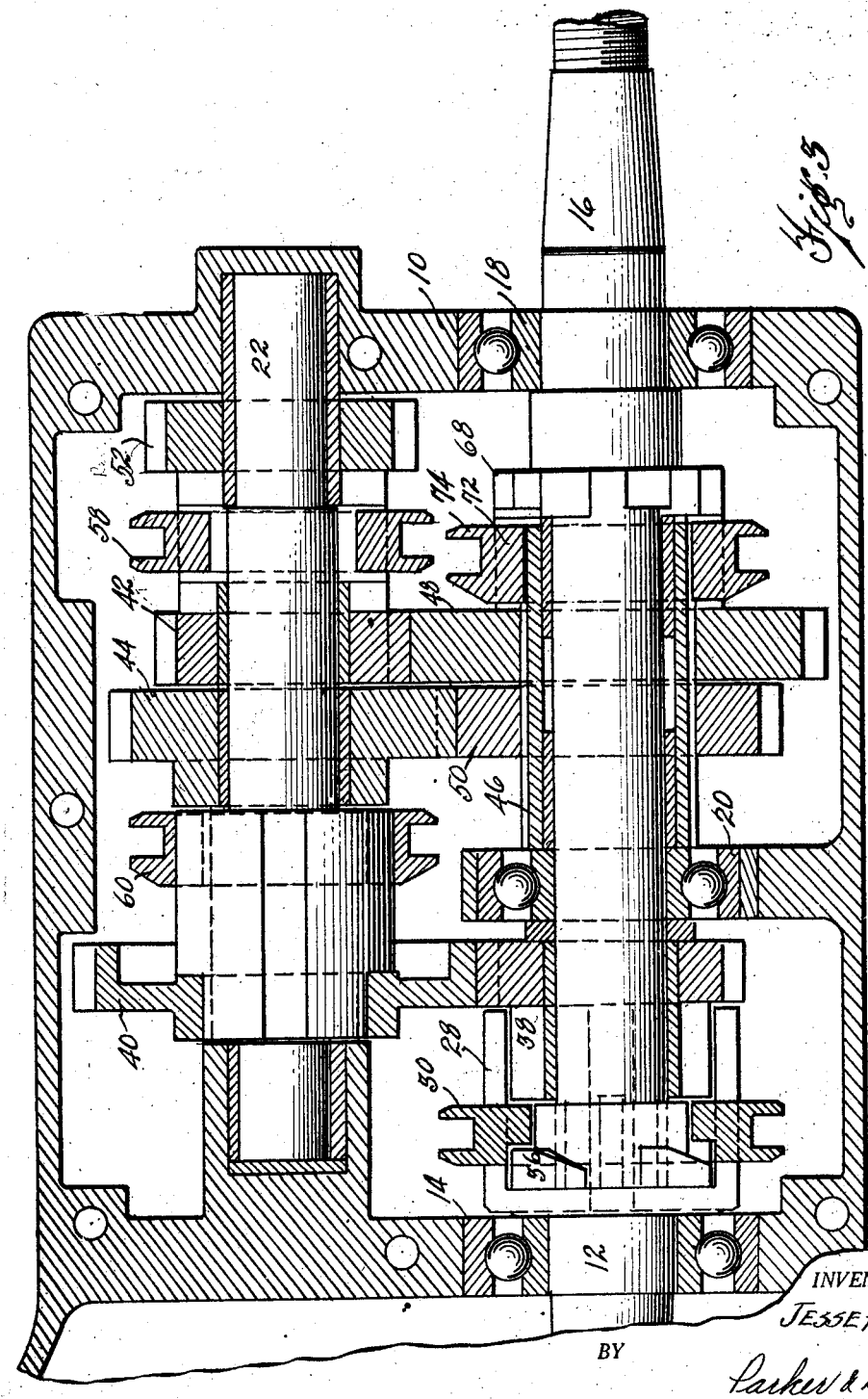

Patented June 19, 1928.

UNITED STATES PATENT OFFICE.

JESSE H. HAND, OF CHICAGO, ILLINOIS.

CHANGE-SPEED GEARING.

Application filed February 10, 1927. Serial No. 167,159.

My invention relates to improvements in change speed gearing and particularly to that type of gearing broadly illustrated in my U. S. Patent No. 1,517,836, dated December 2, 1924.

An object of my invention is to provide mechanism of the character described wherein means are employed to automatically releasably lock the gearing against movement from the high speed position to one of the intermediate speed positions without the performance of the necessary manual operation of shifting and wherein means is provided automatically responsive to a definite manual movement to assist in the shifting operation. More specifically I provide mechanism adapted to lock a part of the shifting mechanism when the gearing is in the high speed position, which mechanism is releasable to permit the gearing to assume one of the intermediate speed positions, and I also provide mechanism automatically operable to exert a force tending to assist in the movement of the parts necessary to accomplish the placing of the gearing in one of the intermediate speed positions.

Other advantages and meritorious features of my invention will more fully appear in the following specification, appended claims and accompanying drawings wherein:

Fig. 3 is a horizontal sectional view through the construction shown in Fig. 1.

Figure 2:
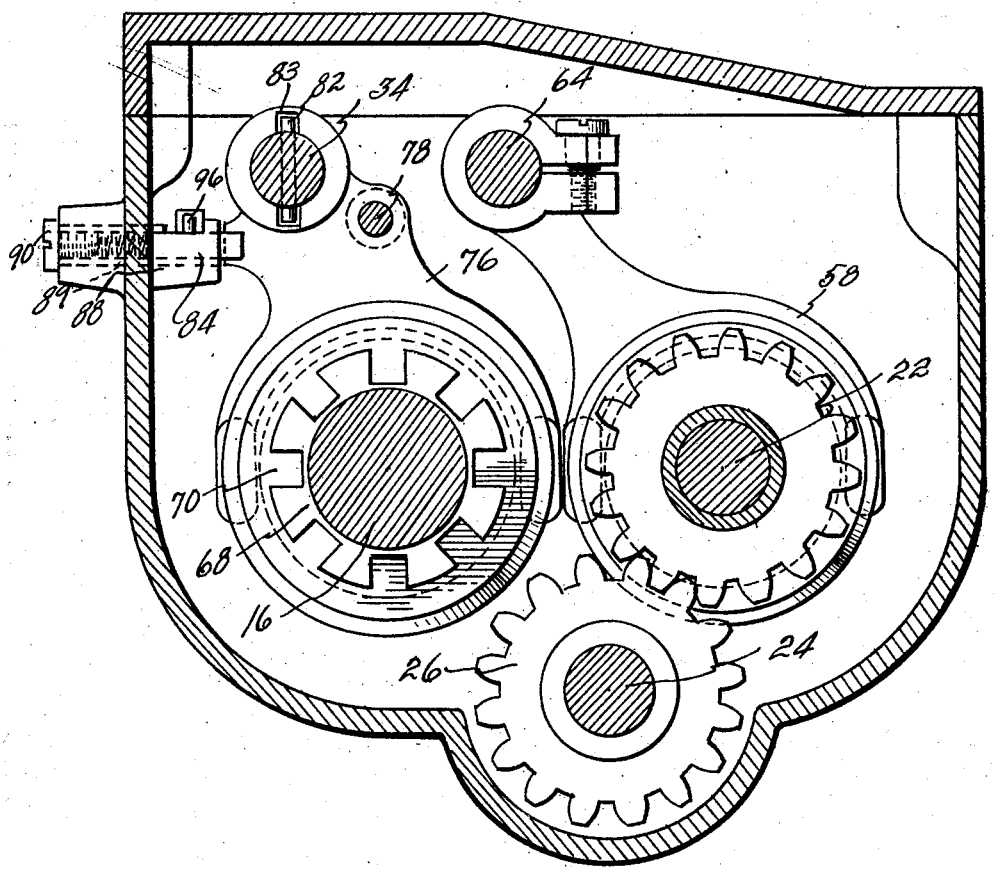
Fig. 2 is a vertical sectional view taken on line 2—2 of Fig. 1.

There is a casing 10 within which my change speed gearing is mounted. A drive shaft 12 is supported within a bearing 14; a main shaft 16 is supported within bearings 18 and 20, and a countershaft 22 is likewise suitably supported in substantially the same horizontal plane as the main shaft as appears in Fig. 2. A dead reverse shaft 24 is provided upon which is rotatably mounted a reverse gear 26.

The drive shaft carries a hub 28 within which the end of the main shaft is disposed. This hub carries a master clutch ring 30 which is adapted to be actuated longitudinally of the hub by a shifter fork 32 which is carried by the shifter rod 34 to pick up a high speed header 36 which header is removably splined upon the main shaft 16 to cause such main shaft to rotate as one piece with the drive shaft or to be actuated in the opposite direction to pick up the recessed hub of the master gear 38 which is freely rotatably mounted upon the main shaft and is constantly in mesh with the drive pinion 40 fixed to the countershaft to drive the countershaft through such gear 38 and pinion 40.

The countershaft carries first and second change speed gears 42 and 44, and the main shaft carries a sleeve 46 freely rotatably supported thereupon, upon which sleeve are fixed first and second change speed gears 48 and 50, which change speed gears are in constant mesh with the change speed gears 42 and 44 upon the countershaft respectively. The countershaft also carries a reverse gear 52 rotatably mounted thereon which drives the reverse gear 26 on the reverse shaft 24, which reverse gear 26 in turn drives the main shaft through the gear 48.

The change speed gears 48 and 50 are splined upon the sleeve 46 but said sleeve is freely rotatable upon the main shaft so that the main shaft may rotate with the drive shaft within such sleeve. The change speed gears 42 and 44 are freely mounted upon the countershaft to permit the countershaft to rotate independently thereof but each gear is provided with a hub portion having locking recesses adapted to be engaged by lugs on the clutch collars 58 and 60 respectively when such collars are independently actuated to pick up the desired change speed gears.

Clutch collar 58 is provided with a shifter fork 62 which is mounted upon the shifter rod 64. Clutch collar 60 is provided with a shifter fork 66 which is carried by the shifter rod 34. Clutch collar 60 when actuated picks up the second speed gear 44, driving the main shaft through the countershaft. Clutch collar 58 when actuated in one direction picks up the first speed pinion 42, driving the main shaft through the countershaft and when actuated in the opposite direction picks up the reverse pinion 52, driving the main shaft in reverse.

The main shaft is provided with a hub 68 adjacent the rear end of the sleeve, which hub is provided with a series of locking recesses 70 adapted to receive lugs 72 formed on the clutch collar 74, which clutch collar is engaged by the shifter fork 76, which fork is freely mounted upon the shifter rod 34. The clutch collar is splined to a hub on the sleeve 46 to rotate with the sleeve.

A pin 78 extends rearwardly from the shifter fork through the end of the change speed gear casing and is provided exteriorly thereof with a spring 80 adapted to exert a tension thereon tending to hold the shifter fork rearwardly to maintain the clutch collar 74 in engagement with the hub 68 on the main shaft to rotate the same.

The shifter rod 34 carries a pin 82 extending radially therefrom which is adapted to be received within a recess 83 of the clutch collar, and when the shifter rod is moved forwardly toward the high speed position, this pin moves the shifter fork 76 forwardly and likewise the clutch collar 74 carrying the same out of engagement with the hub 68.

There is provided a plunger 84, slidably mounted within a suitable bearing tubing 86, which bearing tubing is pressed within a boss 88 formed on the wall of the casing so that the plunger may move in and out. This plunger is held inwardly by a spring 89 which in turn is held in place by a screw 90.

The shifter rod 34 carries a finger 92 which is here shown as extending rearwardly along the shifter rod from a point adjacent to the place of attachment of the shifter fork 66 to such rod. This finger has a tip 94 that engages a pin 96 of the plunger 84 to withdraw such plunger against the tension of the spring 89 when the shifter rod is moved rearwardly to bring the clutch collar 74 into engagement with the hub 68.

Figure 1:
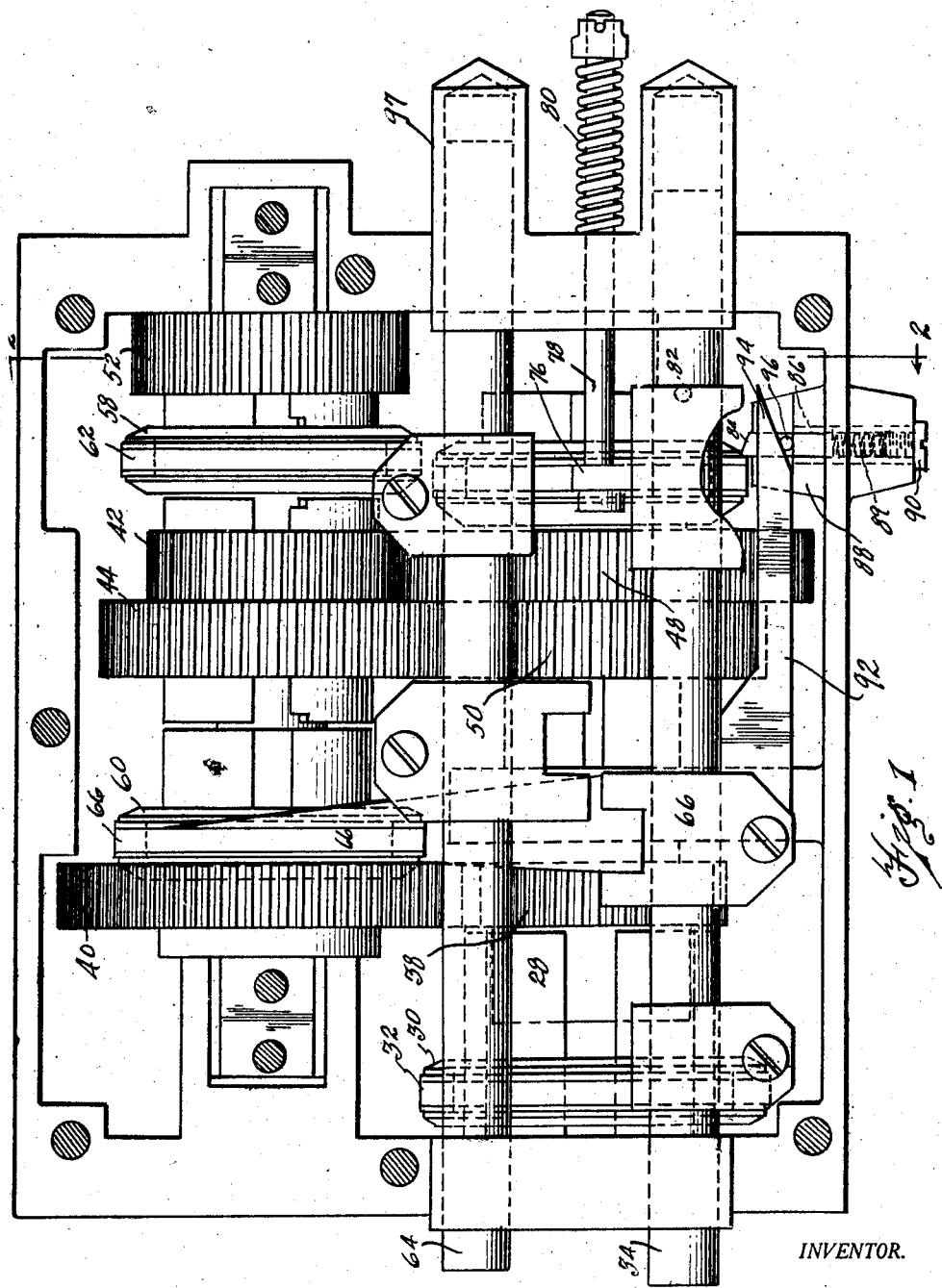
Fig. 1 is a plan of my change speed gearing within the casing with the top of the casing removed.

When the shifter rod 34 is moved forwardly to bring the master clutch ring 30 into engagement with the high speed header 36 to lock the main shaft to rotate with the drive shaft as one piece, the plunger 84 is moved outwardly by the spring 89 to engage rearwardly of the shifter fork 77, as shown in Fig. 1, to releasably hold such shifter fork in such position with the clutch collar 74 out of engagement with the hub 68. As above described, rearward movement of the shifter rod causes the finger 92 to actuate the plunger 84 through engagement of such finger with the pin 96 so that the clutch collar 74 is brought into engagement with the hub 68. The clutch collar 74 is, of course, pulled into engagement with the hub 68 through the tension of the spring 80. 97 indicates a housing which receives the ends of the shifter rods as shown in Fig. 1.

What I claim is:

1. In change speed gearing, a drive shaft, a main shaft, a countershaft, means operable to couple the main shaft with the drive shaft to be driven as one piece therewith and operable to couple the main shaft with the drive shaft through the countershaft including shift rods, shift forks, and parts actuated thereby, a spring device engaging one of said parts to automatically releasably lock it in one position and a finger carried by one shift rod extending linearly thereof engaging said spring device to retract the same against the action of its spring.

2. In change speed gearing, a drive shaft, a main shaft, a countershaft, means operable to couple the main shaft with the drive shaft to be driven as one piece therewith and operable to couple the main shaft with the drive shaft through the countershaft including shift rods, shift forks, and parts actuated thereby, and a spring device engaging one of said parts to assist in coupling the main shaft to the drive shaft through the countershaft, a second spring device automatically operable to releasably lock one of said parts against movement to prevent coupling of the main shaft to the drive shaft through the countershaft, and a finger carried by one of said shift rods engaging said second spring device to actuate the same against the action of the spring to release the part locked thereby upon movement of said shift rod to couple the drive shaft to the main shaft through the countershaft.

3. In change speed gearing, a drive shaft, a main shaft, a countershaft, change speed gears on the main shaft, change speed gears on the countershaft, a clutch device operable to couple the main shaft with the drive shaft to rotate as one piece therewith independently of the countershaft, a clutch device operable to couple the countershaft with the drive shaft to be driven thereby, clutch devices operable to couple individual change speed gears on the countershaft thereto to rotate therewith, a clutch device operable to lock the change speed gears on the main shaft to such shaft to rotate therewith, and a spring member to actuate said last named clutch device.

4. In change speed gearing, a drive shaft, a main shaft, a countershaft, change speed gears on the main shaft, change speed gears on the countershaft, a clutch device operable to couple the main shaft with the drive shaft to rotate as one piece therewith independently of the countershaft, a clutch device operable to couple the countershaft with the drive shaft to be driven thereby, clutch devices operable to couple individual change speed gears on the countershaft thereto to rotate therewith, a clutch device operable to lock the change speed gears on the main shaft to such shaft to rotate therewith, shift rods and shift forks to control said clutch devices and spring actuated mechanism under control of said shift rods and shift forks adapted to actuate said last named clutch device to lock the change speed gears on the main shaft to such shaft.

5. Change speed gearing having a drive shaft, a main shaft, a countershaft, means operable to couple the drive shaft with the main shaft to rotate as one piece therewith and operable to couple the main shaft with the drive shaft through the countershaft including shift rods, shift forks, and parts actuated thereby; a spring catch automatically operable to engage one of said parts to releasably lock the same in one position, a finger carried by one of the shift rods extending linearly thereof adapted to engage said spring catch to actuate the same against the action of its spring when the shift rod is actuated to move the part engaged by the spring catch to a second position.

In testimony whereof I, JESSE H. HAND, sign this specification.

JESSE H. HAND.